(12) United States Patent
Takeda et al.

(10) Patent No.: US 7,664,675 B2
(45) Date of Patent: Feb. 16, 2010

(54) DISTRIBUTION AIDING METHOD, DISTRIBUTION AIDING SERVER, RECORDING MEDIUM, DISTRIBUTION AIDING PROGRAM, AND DEALER TERMINAL

(75) Inventors: Seiji Takeda, Osaka (JP); Akira Ueno, Osaka (JP); Hiroyuki Kawamura, Osaka (JP); Tsuguo Nakajima, Koto (JP); Tsuyoshi Kimura, Koto (JP); Kouji Itoh, Koto (JP)

(73) Assignees: Wako Pure Chemical Industries, Ltd., Osaka-shi (JP); Fujitsu FIP Corporation, Tokyo (JP)

( * ) Notice: Subject to any disclaimer, the term of this patent is extended or adjusted under 35 U.S.C. 154(b) by 791 days.

(21) Appl. No.: 10/275,276

(22) PCT Filed: May 10, 2001

(86) PCT No.: PCT/JP01/03895

§ 371 (c)(1), (2), (4) Date: Nov. 12, 2002

(87) PCT Pub. No.: WO01/86529

PCT Pub. Date: Nov. 15, 2001

(65) Prior Publication Data

US 2003/0115112 A1    Jun. 19, 2003

(30) Foreign Application Priority Data

May 12, 2000    (JP) .............................. 2000-140724

(51) Int. Cl.
*G06Q 30/00* (2006.01)

(52) U.S. Cl. .......................................... 705/26; 705/27
(58) Field of Classification Search .................. 705/26, 705/27
See application file for complete search history.

(56) References Cited

U.S. PATENT DOCUMENTS

| 7,333,944 | B1 * | 2/2008 | Harris | 705/26 |
| 2002/0010658 | A1 * | 1/2002 | Suzuki et al. | 705/28 |
| 2002/0032579 | A1 * | 3/2002 | Harpale | 705/1 |

(Continued)

FOREIGN PATENT DOCUMENTS

JP    7-121611    5/1995

(Continued)

OTHER PUBLICATIONS

Merriam-Webster's Collegiate Dictionary Tenth Edition, Definition of Dealer.*

(Continued)

*Primary Examiner*—Mark Fadok
(74) *Attorney, Agent, or Firm*—Kratz, Quintos & Hanson, LLP

(57) ABSTRACT

The present invention relates to a distribution aiding system, a distribution aiding server, a distribution aiding method, and a distribution aiding program capable of selling articles without individual trading conditions being known to a maker, other users or other dealers, and is so configured that a user retrieves or selects a necessary article, the user registers order information according to the selected article, and a dealer in charge of the user registers order-acceptance condition information to be added to the order information, and notifies the user of the order-acceptance condition information.

11 Claims, 17 Drawing Sheets

U.S. PATENT DOCUMENTS

| | | | |
|---|---|---|---|
| 2002/0087425 A1* | 7/2002 | Tokuhiro et al. | 705/26 |
| 2002/0107746 A1* | 8/2002 | Jacoby, Jr. | 705/26 |
| 2003/0014318 A1* | 1/2003 | De La Motte et al. | 705/26 |
| 2003/0167222 A1* | 9/2003 | Mehrotra et al. | 705/37 |

FOREIGN PATENT DOCUMENTS

| | | |
|---|---|---|
| JP | 10-261026 | 9/1998 |
| JP | 11-31184 | 2/1999 |
| JP | 2000-113039 | 4/2000 |

OTHER PUBLICATIONS

English Translation of foreign patent JP10-261026, see IDS received Nov. 12, 2002.*

English Translation of foreign patent JP 1131184, see IDS received Nov. 12, 2002.*

English Translation of foreign patent JP 7-121611, see IDS received Nov. 12, 2002.*

English Translation of foreign artilces RieKuwahara, see IDS received Nov. 12, 2002.*

English Translation of foreign artilce Kobayashi, see IDS received Nov. 12, 2002.*

English Translation of foreign artilce Manabu, Nagai, see IDS received Nov. 12, 2002.*

Rie Kuwahara, my SAP.com, Nikkei Computer, No. 481, pp. 32-35, Oct. 25, 1999. See PCT search report.

Youko Kobayashi, Nikkei Computer, No. 454, pp. 94-95, Oct. 1998. See PCT search report.

Manabu Nagai, Nikkei Net Business, No. 51, pp. 83-89, Sep. 15, 1999. See PCT search report.

Japanese Office Action mailed Jan. 6, 2009 with English translation of relevant portion (16 pages).

Trade Based on Many-Item Catalog in Nikkei NetBusiness, May 2000, with English translation of relevant portion (10 pages).

Electronic Business: Completion of All Business Transactions via the Internet in Nikkei Multimedia, Aug. 1997, with English translation of relevant portion (12 pgs.).

* cited by examiner

FIG.5

| USER ID | aaaa | bbbb |
|---|---|---|
| PASSWORD | 1234 | 5678 |
| USER LEVEL | USER | USER |
| COMPANY NAME | A CO., LTD. | B SHOP |
| DEPARTMENT | · | · |
| FULL NAME (CHINESE CHARACTER) | · | · |
| FULL NAME (READING IN KANA) | · | · |
| FULL NAME (ROMAN CHARACTER) | · | · |
| TELEPHONE NUMBER | · | · |
| FACSIMILE NUMBER | · | · |
| E-MAIL ADDRESS | · | · |
| PERSONAL CODE | 1 | 2 |
| DEALER CODE | zzz | zzz |
| DESTINATION BOX-ID | · | · |
| REFERENCE BOX-ID | · | · |
| ORGANIZATION FORM FLAG | · | · |
| MATERIAL CODE | · | · |
| FIELD | · | · |

FIG.12

●DELIVERY DATE ANSWER

70 ITEMS WAITING TO BE APPROVED   PAGE 1/4

FREE: FREE ORDER   &: ESTIMATION REQUEST   ⇧: PROCESS DELAY

CSV FILE BATCH PROCESSING

LAST 20 ITEMS   NEXT 20 ITEMS

[↑ DOWNLOAD]   [REFERENCE]   [↑ UPLOAD]

| ORDER ACCEPTANCE NO. | ORDER ACCEPTANCE DATE | ORDER DATE | COMPANY/ COLLEGE NAME | DEPARTMENT NAME | ORDERER NAME | TEL |
|---|---|---|---|---|---|---|
| 0000000001 ⇧ | 1/19/1999 09:07:00 | | XYZ CO., LTD | CHEMOSYNTHESIS DIVISION | TARO YAMADA | XX-XXXX-XXXX |
| 0000000002 | 1/19/1999 11:09:05 | | XYZ CO., LTD | CHEMOSYNTHESIS DIVISION | AIKO ITOH | XX-XXXX-XXXX |
| 0000000003 ⇧& | 1/19/1999 19:07:00 | | XYZ CO., LTD | ENVIRONMENTAL SUBSTANCE SYNTHESIS GROUP | HIROYUKI SANADA | XX-XXXX-XXXX |
| 0000000003 ⇧& | 1/19/1999 19:07:00 | | XYZ CO., LTD | ENVIRONMENTAL SUBSTANCE SYNTHESIS GROUP | HIROYUKI SANADA | XX-XXXX-XXXX |
| 0000000003 | 1/19/1999 19:07:00 | | XYZ CO., LTD | ENVIRONMENTAL SUBSTANCE SYNTHESIS GROUP | HIROYUKI SANADA | XX-XXXX-XXXX |

○ DELIVERY-DATE ANSWER PARTICULARS

| ORDER ACCEPTANCE NO. | 0000000001 | ORDER ACCEPTANCE DATE | 1/19/1999 09:07:00 | |
|---|---|---|---|---|
| ORDERER CODE | 0123456789012456789 | ORDERER NAME | ORDERER TEL | 00-123-4567 |

| DISTRIBUTOR | DISTRIBUTOR CODE | COMMODITY NAME | GRADE | VOLUME | QUANTITY | PRICE | DELIVERY PRICE | DELIVERY DATE | STOCK STATUS | TRANSMIT |
|---|---|---|---|---|---|---|---|---|---|---|
| MANUFACTURER | MANUFACTURER CODE | | | | | | | | | |
| REAGENT MAKER INDUSTRY CO., LTD. | 014-00082 | ANTI-MOUSE IgG(H+L), RABBIT, F(sb')2, PEROXIDASE BOND | GRADE NAME 01 | 2ml | 70 | ¥1,000 | | 2000 Y / 3 M / 22 D | 70 | ☐ |
| Dih Ikihkik Kjkasdbk Hjbtb CO | ALS 003-07456 | 2,7-BIS (4-METHYL-2-SULFANILIC AZO) 1,8-DIHYDROXY-3,5-NAPHTHALENEDISULFONIC ACID DISODIUM | GRADE NAME 01 | 2ml | 70 | ¥1,000 | | 2000 Y / 3 M / 22 D | 70 | ☐ |
| REAGENT MAKER INDUSTRY CO., LTD. | 052-00685 | ANTI-MOUSE IgG(H+L), RABBIT, F(sb')2, PEROXIDASE BOND | GRADE NAME 01 | 2ml | 70 | ¥1,000 | | 2000 Y / 3 M / 22 D | 100 OR MORE | ☐ |
| Dih Ikihkik Kjkasdbk Hjbtb CO | ALS 003-07456 | | | | | | | | | |

▼ RETURN TO LIST

● ESTIMATION ANSWER

70 ITEMS WAITING TO BE APPROVED    PAGE 1/4    LAST 20 ITEMS    NEXT 20 ITEMS

FREE : FREE ORDER    &: ESTIMATION REQUEST    ⇧ : PROCESS DELAY

| ESTIMATION RECEIPT NO. | ESTIMATION RECEIPT DATE | COMPANY/COLLEGE NAME | DEPARTMENT NAME | REQUESTER NAME | TEL |
|---|---|---|---|---|---|
| 0000000001 ⇧ | 1/19/1999 09:07:00 | aaa CO., LTD | CHEMOSYNTHESIS DIVISION | TARO YAMADA | XX-XXXX-XXXX |
| 0000000002 ⇧ | 1/19/1999 11:09:05 | aaa CO., LTD | CHEMOSYNTHESIS DIVISION | AIKO ITOH | XX-XXXX-XXXX |
| 0000000003 ⇧ & | 1/19/1999 19:07:00 | bb COLLEGE | BIOENGINEERING LABORATORY | HIROYUKI SANADA | XX-XXXX-XXXX |
| 0000000003 ⇧ & | 1/19/1999 19:07:00 | bb COLLEGE | BIOENGINEERING LABORATORY | HIROYUKI SANADA | XX-XXXX-XXXX |
| 0000000003 | 1/19/1999 19:07:00 | bb COLLEGE | BIOENGINEERING LABORATORY | HIROYUKI SANADA | XX-XXXX-XXXX |
| 0000000003 | 1/19/1999 19:07:00 | bb COLLEGE | BIOENGINEERING LABORATORY | HIROYUKI SANADA | XX-XXXX-XXXX |

ESTIMATION ANSWER PARTICULARS

| ESTIMATION RECEIPT NO | 0000000001 | ESTIMATION RECEIPT DATE | 1/19/1999 09:07:00 | | |
|---|---|---|---|---|---|
| REQUESTER CODE | 0123456789012456789 | REQUESTER NAME | | ORDERER TEL | 00-123-4567 |

| DISTRIBUTOR / MANUFACTURER | DISTRIBUTOR CODE / MANUFACTURER CODE | COMMODITY NAME | GRADE | VOLUME | QUANTITY | PRICE | DELIVERY PRICE | DELIVERY DATE | STOCK STATUS | TRANSMIT |
|---|---|---|---|---|---|---|---|---|---|---|
| REAGENT MAKER INDUSTRY CO., LTD. | 014-00082 | ANTI-MOUSE IgG(H+L), RABBIT, F(sb')2, PEROXIDASE BOND | GRADE NAME 01 | 2ml | 70 | ¥1,000 | | 2000 Y 3 M 22 D | 70 | ☐ |
| Dih Ikihkik Kjkasdbk Hjbtb CO | ALS 003-07456 | 2,7-BIS (4-METHYL-2-SULFANILIC AZO) 1,8-DIHYDROXY-3,5-NAPHTHALENEDISULFONIC ACID DISODIUM | | | | | | | | |
| REAGENT MAKER INDUSTRY CO., LTD. | 052-00685 | ANTI-MOUSE IgG(H+L), RABBIT, F(sb')2, PEROXIDASE BOND | GRADE NAME 01 | 2ml | 70 | ¥1,000 | | 2000 Y 3 M 22 D | 70 | ☐ |
| Dih Ikihkik Kjkasdbk Hjbtb CO | ALS 003-07456 | | GRADE NAME 01 | 2ml | 70 | ¥1,000 | | 2000 Y 3 M 22 D | 100 OR MORE | ☐ |

▼ RETURN TO LIST

| MAKER NAME COMMODITY CODE | COMMODITY NAME | GRADE | VOLUME | QUANTITY |
|---|---|---|---|---|
| MAKER SELECT | ◁ ▷ | | | |
| MAKER SELECT | ◁ ▷ | | | |
| MAKER SELECT | ◁ ▷ | | | |

○ FREE ORDER 190
191

FIG.17

○ SET ORDER PARTICULARS

| SET NO.1 | SET NO.2 | SET NO.3 | SET NO.4 | SET NO.5 |

| CHROMATO-PACKAGE | SELECT ALL | | LAST ORDER DATE 1/18/2000 | | | | △ TOP |
|---|---|---|---|---|---|---|---|
| SELECT | DISTRIBUTOR | DISTRIBUTOR CODE | COMMODITY NAME | GRADE | VOLUME | PRICE | |
| | MANUFACTURER | MANUFACTURER CODE | | | | | |
| × | △△INDUSTRY CO., LTD | 013-00292 | 2.7-BIS(4-METHYL-2-SULFANILIC AZO) 1,8-DIHYDROXY-3,6-NAPHTHALENEDISULFONIC ACID DISODIUM | | 25g | ¥1,000 | |
| | △△INDUSTRY CO., LTD | 318-03231 | | | | | |
| × | ○×□ CO., LTD | 318-03231 | Gene Taq NT (WITH dNTP Mixture) | | 250units | ¥25,000 | |

200

DISTRIBUTION AIDING METHOD, DISTRIBUTION AIDING SERVER, RECORDING MEDIUM, DISTRIBUTION AIDING PROGRAM, AND DEALER TERMINAL

TECHNICAL FIELD

The present invention relates to a distribution aiding method, a distribution aiding server, a recording medium, a distribution aiding program, and a dealer terminal, and more particularly, to a distribution aiding method, a distribution aiding server, a recording medium, a distribution aiding program, and a dealer terminal for aiding sales of articles via a network.

BACKGROUND ART

Recently, online shopping, in which sales of articles (commodities) are conducted on the Internet, has become widespread. In such online shopping, a user purchasing an article and a maker producing and selling the article conduct electronic commerce directly with each other; therefore, dealers, such as a general retail store or a special agent, cannot participate in the sales activities.

One of the systems known as having been developed in consideration of such an inconvenience is a distribution aiding system in which users garnered as customers by each dealer through sales activities are treated as members, and the dealer trades with the users by user terminals used by the members and a server installed by a maker and provided with a virtual dealer sales function.

Individual trading conditions, which each dealer determines with individual users through business negotiation activities, are registered beforehand in this distribution aiding system. Accordingly, upon receiving order-acceptance information from a user, the distribution aiding system automatically calculates a charge and a margin for the dealer according to an individual trading condition corresponding to the user, and delivers according to a predetermined individual trading condition.

By the way, individual trading conditions determined between a user and a dealer include different prices for individual commodities, etc., in accordance with a payment site condition, a delivery date condition, a traded quantity, etc., depending on a sales policy of each dealer, characters of individual customers, etc.; and if the individual trading conditions are known to a maker or rival dealers, the dealer cannot conduct independent business activities as a dealer.

However, in the conventional distribution aiding system, the individual trading conditions determined between each dealer and a user are registered in the distribution aiding server administrated by the maker; thus, there has been a problem that the individual trading conditions are known to the maker. Additionally, regarding the conventional distribution aiding system, there has been a problem that commodities other than commodities (commodity codes) registered beforehand by the maker cannot be sold.

DISCLOSURE OF INVENTION

A general object of the present invention is to eliminate the above-mentioned problems, and a more specific object of the present invention is to provide a distribution aiding method, a distribution aiding server, a recording medium, a distribution aiding program, and a dealer terminal capable of selling articles without individual trading conditions being known to a maker, other users or other dealers.

In order to achieve this object, the present invention, which is a distribution aiding method for conducting a sale of an article between a user using a user terminal and a dealer using a dealer terminal, where the foregoing user terminal and the foregoing dealer terminal are connected via a network, is arranged to comprise an article search step in which the user connects the foregoing user terminal via the foregoing network and searches or selects a necessary article, an order information registration step in which the foregoing user registers order information according to the foregoing selected article, an order-acceptance condition registration step in which the dealer in charge of the foregoing user connects the foregoing dealer terminal via the foregoing network and registers order-acceptance condition information to be added to the foregoing order information, and an order-acceptance condition notification step in which the foregoing user is notified of the foregoing order-acceptance condition information.

Besides, the distribution aiding method is realized by a distribution aiding server, for example, which performs processes corresponding to the above-mentioned article search step, the order information registration step, the order-acceptance condition registration step, and the order-acceptance condition notification step. This distribution aiding server is connected to the user terminal and the dealer terminal via the network, and supports the sale of articles conducted between the user and the dealer.

In this distribution aiding method, the dealer connects the dealer terminal to the distribution aiding server, for example, via the foregoing network, and adds the order-acceptance condition information corresponding to a price, a delivery date and so forth to the order information from the user. That is, the order-acceptance condition information is not registered in the distribution aiding server, etc.; thus, a trade can be conducted without the order-acceptance condition information determined by the dealer for each user being known to a maker, other users or dealers.

Additionally, the present invention may be so arranged that the foregoing order-acceptance condition registration step comprises an order information reception step in which the foregoing dealer connects the foregoing dealer terminal via the foregoing network and receives the order information registered by the foregoing user, and the order-acceptance condition registration step in which the order-acceptance condition information is added to the foregoing order information, and the foregoing dealer connects the foregoing dealer terminal via the foregoing network and registers the order information to which the foregoing order-acceptance condition information is added.

In this distribution aiding method, the dealer connects the dealer terminal to the distribution aiding server, for example, via the foregoing network, and receives the order information registered by the user. Then, the order-acceptance condition information corresponding to a price, a delivery date and so forth can be added to the received order information, and the order information to which the order-acceptance condition information is added can be registered again in the distribution aiding server, etc. Thus, the order-acceptance condition information is not registered in the distribution aiding server, etc.; accordingly, a trade can be conducted without the order-acceptance condition information determined by the dealer for each user being known to a maker, other users or dealers. That is, each dealer can carry out its own sales policy while participating in one distribution aiding system.

Additionally, the present invention may be so arranged that the foregoing order information registration step is a step of registering the foregoing order information after an approval of a manager is obtained, when the foregoing user is a user who cannot register the foregoing order information without obtaining the foregoing approval of the foregoing manager.

According to this distribution aiding method, even when an organization form has subdivided role powers for ordering, application, approval and so forth, processes of ordering, application, approval and so forth in accordance with the organization form become possible.

Additionally, the present invention may be arranged to further comprise an order-reception information notification step of creating order-reception information according to the order information registered by the foregoing user, and notifying the foregoing user of the foregoing order-reception information.

In this distribution aiding method, the order-reception information can be created according to the order information registered by the user, and the order-reception information can be communicated to the user, as occasion demands. Accordingly, the user can use the communicated order-reception information in a report, etc.

Additionally, the present invention may be arranged to further comprise an article order step of referring to stock information of the dealer in charge of the foregoing user, and placing an order with a maker for the article included in the foregoing order information according to stock status of the article.

According to this distribution aiding method, the stock information of the dealer can be referred to so that, when the stock of the article included in the order information runs short, the articles can be automatically ordered to the maker.

Additionally, the present invention may be arranged to further comprise an authentication step of performing an authentication of the user or the dealer connecting the user terminal or the dealer terminal via the foregoing network, and a menu screen display step of displaying a menu screen on the foregoing user terminal or the foregoing dealer terminal in accordance with a result of the foregoing authentication.

In this distribution aiding method, when the user connects via the network, a screen indicating the connection to the dealer in charge of (making a contract beforehand with) the user is displayed according to the authentication result. Besides, when the dealer connects via the network, a menu screen in accordance with the authentication result can be displayed.

Additionally, the present invention may be arranged to further comprise a free order information registration step in which the foregoing user connects the foregoing user terminal and registers order information with respect to an article which is unregistered.

According to this distribution aiding method, it becomes possible to register order information with respect to an article not registered in the distribution aiding server, for example. Accordingly, the user can place an order with the dealer for a reagent not yet registered in the distribution aiding server, or for an article which may not be registered in the distribution aiding server.

Additionally, the present invention may be arranged to further comprise a set registration step in which several types of articles to be ordered at one time and order quantities of the foregoing articles are registered as a set, and a set order information registration step in which the foregoing user connects the foregoing user terminal and registers order information according to the foregoing set.

According to this distribution aiding method, the user can register several types of reagents frequently purchased together and quantities of the reagents as a set, for example. Accordingly, the user can easily place an order with the dealer for desired reagents by selecting the reagents grouped beforehand into the set. Besides, several types of articles frequently ordered to the dealer at one time and order quantities of the articles can also be registered as a set.

Additionally, in order to achieve the above-mentioned object, the present invention, which is a distribution aiding server for conducting a sale of an article between a user using a user terminal and a dealer using a dealer terminal, where the foregoing user terminal and the foregoing dealer terminal are connected to the foregoing distribution aiding server via a network, is arranged to comprise an article search part for the user to connect the foregoing user terminal and search or select a necessary article, an order information registration part for the foregoing user to register order information according to the foregoing selected article, an order-acceptance condition registration part for the dealer in charge of the foregoing user to connect the foregoing dealer terminal and register order-acceptance condition information to be added to the foregoing order information, and an order-acceptance condition notification part for notifying the foregoing user of the foregoing order-acceptance condition information.

Additionally, in order to achieve the above-mentioned object, the present invention, which is a distribution aiding method for conducting a sale of an article by using a user terminal, a dealer terminal, and a distribution aiding server connected to the foregoing user terminal and the foregoing dealer terminal via a network, is arranged to comprise a step in which the user connects the foregoing user terminal to the foregoing distribution aiding server via the foregoing network and searches or selects a necessary article, a step in which the foregoing user connects the foregoing user terminal to the foregoing distribution aiding server via the foregoing network and registers order information according to the foregoing selected article, a step in which the dealer in charge of the foregoing user connects the foregoing dealer terminal to the foregoing distribution aiding server via the foregoing network and adds order-acceptance condition information to the foregoing order information, and a step in which the foregoing user is notified of the foregoing order-acceptance condition information.

Additionally, in order to achieve the above-mentioned object, the present invention, which is a computer readable recording medium storing a program for conducting a sale of an article between a user using a user terminal and a dealer using a dealer terminal, where the foregoing user terminal and the foregoing dealer terminal are connected via a network, is arranged to store a program including an article search part for the user to connect the foregoing user terminal and to search or select a necessary article, an order information registration part for the foregoing user to register order information according to the foregoing selected article, an order-acceptance condition registration part for the dealer in charge of the foregoing user to connect the foregoing dealer terminal and register order-acceptance condition information to be added to the foregoing order information, and an order-acceptance condition notification part for notifying the foregoing user of the foregoing order-acceptance condition information.

By using the above-mentioned recording medium storing the distribution aiding program, the above-mentioned object can be achieved. Besides, various types of recording media can be used as the recording medium storing the distribution aiding program, which include a recording medium storing information optically, electrically or magnetically, such as a floppy disk, or a magneto-optical disk (MO) as well as a CD-ROM, and a semiconductor memory storing information electrically, such as a ROM or a flash memory.

Additionally, in order to achieve the above-mentioned object, the present invention, which is a distribution aiding method for a dealer for conducting a sale of an article to a user using a user terminal, where the foregoing user terminal and a distribution aiding server are connected via a network, is arranged to comprise an order information search step in which the dealer connects a dealer terminal to the foregoing distribution aiding server via the foregoing network and searches order information registered by the user of whom the dealer is in charge from among order information registered in the foregoing distribution aiding server, and an order-acceptance condition addition step in which order-acceptance condition information is added to the foregoing searched order information.

Additionally, the present invention may be so arranged that the foregoing order-acceptance condition addition step comprises an order information reception step of connecting to the foregoing distribution aiding server and receiving the foregoing searched order information, and an order-acceptance condition registration step of adding the order-acceptance condition information to the foregoing order information, and connecting to the foregoing distribution aiding server and registering the order information to which the foregoing order-acceptance condition information is added.

Additionally, in order to achieve the above-mentioned object, the present invention may be a distribution aiding program for causing a computer to perform an article search procedure in which a user connects a user terminal to a distribution aiding server via a network and searches or selects a necessary article, an order information registration procedure in which the foregoing user registers order information according to the foregoing selected article, an order-acceptance condition registration procedure in which a dealer in charge of the foregoing user connects a dealer terminal to the foregoing distribution aiding server via the foregoing network and registers order-acceptance condition information to be added to the foregoing order information, and an order-acceptance condition notification procedure in which the foregoing user is notified of the foregoing order-acceptance condition information.

Additionally, in order to achieve the above-mentioned object, the present invention, which is a dealer terminal for conducting a sale of an article to a user using a user terminal, where the foregoing user terminal and a distribution aiding server are connected to the foregoing dealer terminal via a network, is arranged to comprise an order information search part in which the foregoing dealer terminal is connected to the foregoing distribution aiding server via the foregoing network and order information registered by the user of whom a dealer using the dealer terminal is in charge is searched from among order information registered in the foregoing distribution aiding server, and an order-acceptance condition adding part for adding order-acceptance condition information to the foregoing searched order information.

Additionally, the foregoing order-acceptance condition adding part may be arranged to comprise an order information receiving part in which the foregoing dealer terminal is connected to the foregoing distribution aiding server and the foregoing searched order information is received, and an order-acceptance condition registering part in which the order-acceptance condition information is added to the foregoing order information, and the dealer terminal is connected to the foregoing distribution aiding server and then the order information, to which the foregoing order-acceptance condition information is added, is registered.

By using the above-mentioned recording medium storing the distribution aiding program, the above-mentioned object can be achieved. Besides, various types of recording media can be used as the recording medium storing the distribution aiding program, which include a recording medium storing information optically, electrically or magnetically, such as a floppy disk, or a magneto-optical disk (MO) as well as a CD-ROM, and a semiconductor memory storing information electrically, such as a ROM or a flash memory.

BRIEF DESCRIPTION OF DRAWINGS

Features and advantages of the present invention will become more apparent from reading the following detailed description in conjunction with the accompanying drawings.

FIG. 5 is a configuration diagram of an example of a customer master.

FIG. 12 is a screen diagram of an example of a delivery-date answer status screen.

FIG. 13 is a screen diagram of an example of a delivery-date answer particulars screen.

FIG. 14 is a screen diagram of an example of an estimation answer list screen.

FIG. 15 is a screen diagram of an example of an estimation answer particulars screen.

FIG. 16 is a screen diagram of an example of a free order screen.

FIG. 17 is a screen diagram of an example of a set order screen.

BEST MODE FOR CARRYING OUT THE INVENTION

Hereinbelow, a description will be given, with reference to the drawings, of an embodiment according to the present invention. In the present embodiment, the description will be made on a distribution aiding system utilizing a distribution aiding method for selling reagents; however, articles (commodities) are not limited thereto.

Figure 1:
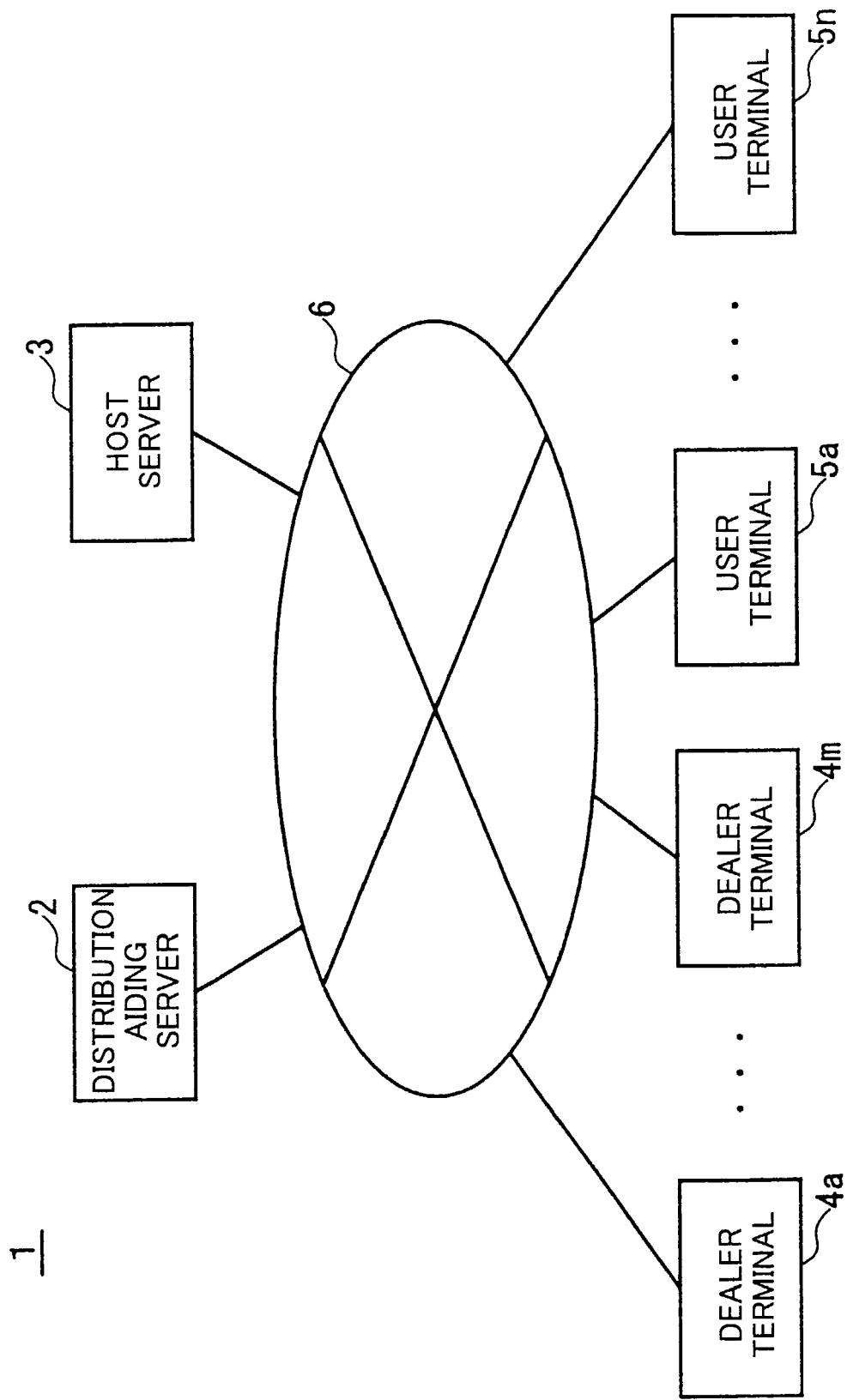
FIG. 1 is a system configuration diagram of one embodiment of a distribution aiding system according to the present invention.

FIG. 1 shows a system configuration diagram of one embodiment of a distribution aiding system 1 according to the present invention. In the distribution aiding system 1 shown in FIG. 1, a distribution aiding server 2, a host server 3, dealer terminals 4a to 4m, and user terminals 5a to 5n are connected via a network 6, such as the Internet.

The user terminals 5a to 5n are connected to the distribution aiding server 2 via the network 6 by being operated by users. The users include users to whom authentication information, such as an ID and a password, is already issued so as to be qualified to order reagents, and general users (one-shot-customer users) to whom the authentication information is not issued, and who are qualified only to estimate reagents.

The dealer terminals 4a to 4m are connected to the distribution aiding server 2 via the network 6 by being operated by dealers. The dealers are, for example, general retail stores or special agents mediating between users and makers. The host server 3 performs processes, such as a stock management and a post-order process, which are not performed by the hereinafter-described distribution aiding server 2. The distribution aiding server 2 is connected to the dealer terminals 4a to 4m and the user terminals 5a to 5n via the network 6.

The distribution aiding server 2 performs an authentication upon connecting to the dealer terminals 4a to 4m or the user terminals 5a to 5n via the network 6, and performs a distribution aiding process as described hereinafter according to an authentication result thereof.

Figure 2:
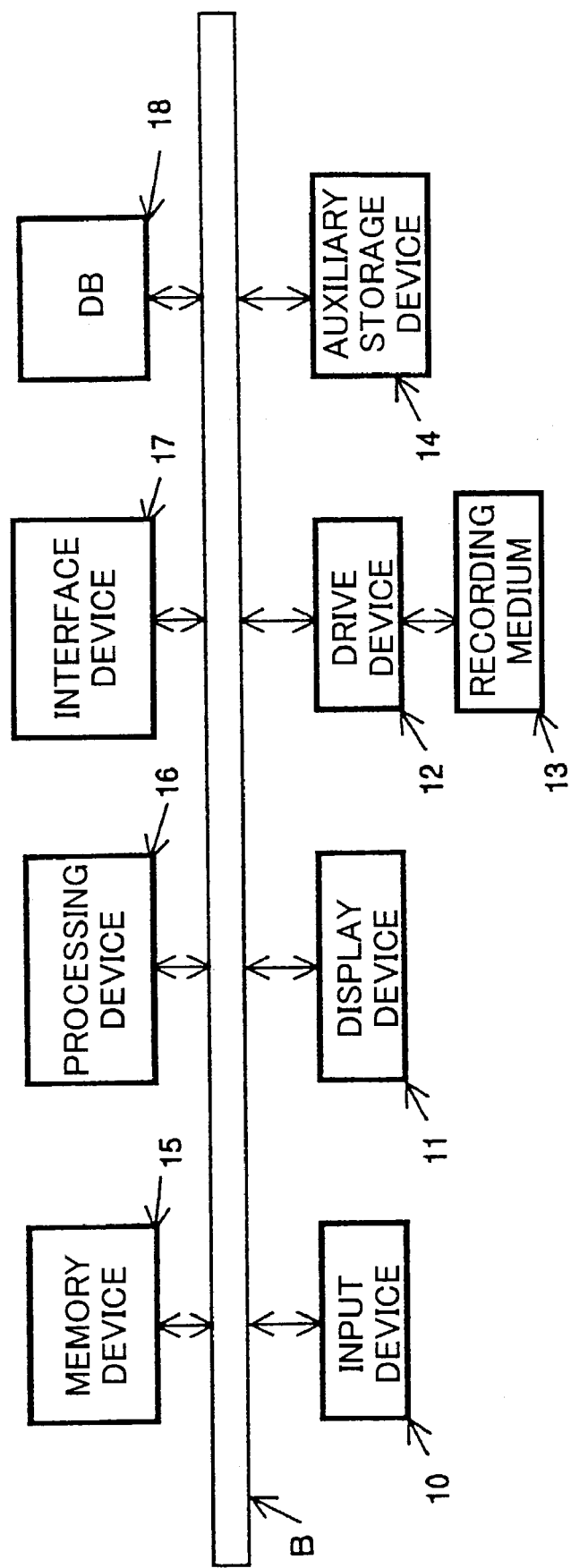
FIG. 2 is a configuration diagram of one embodiment of a computer system realizing a distribution aiding server according to the present invention.

FIG. 2 shows a configuration diagram of one embodiment of a computer system realizing the distribution aiding server 2. In FIG. 2, this computer system comprises an input device 10, a display device 11, a drive device 12, a recording medium 13, an auxiliary storage device 14, a memory device 15, a processing device 16, an interface device 17, and a database (hereinbelow referred to as DB) 18, which are connected with one another by a bus B.

The input device 10 comprises a keyboard, a mouse and so forth which are operated by a user of the computer system, and is used for inputting various operation signals to the computer system. The display device 11 displays various windows, data and so forth necessary for operating the computer system. The interface device 17 is an interface used for connecting the computer system to the network 6, and is composed of a modem, etc, for example. The DB 18 stores data required in the distribution aiding server 2.

A distribution aiding program concerning the distribution aiding system is provided by the recording medium 13, such as a CD-ROM. The recording medium 13 storing the distribution aiding program is set in the drive device 12, and the program is installed from the recording medium 13 via the drive device 12 into the auxiliary storage device 14.

The auxiliary storage device 14 stores the installed distribution aiding program, and also stores necessary files, data and so forth. The memory device 15 reads and stores the distribution aiding program from the auxiliary storage device 14 when the computer system is started. The processing device 16 performs processes concerning the distribution aiding system according to the distribution aiding program read and stored by the memory device 15.

Figure 3:
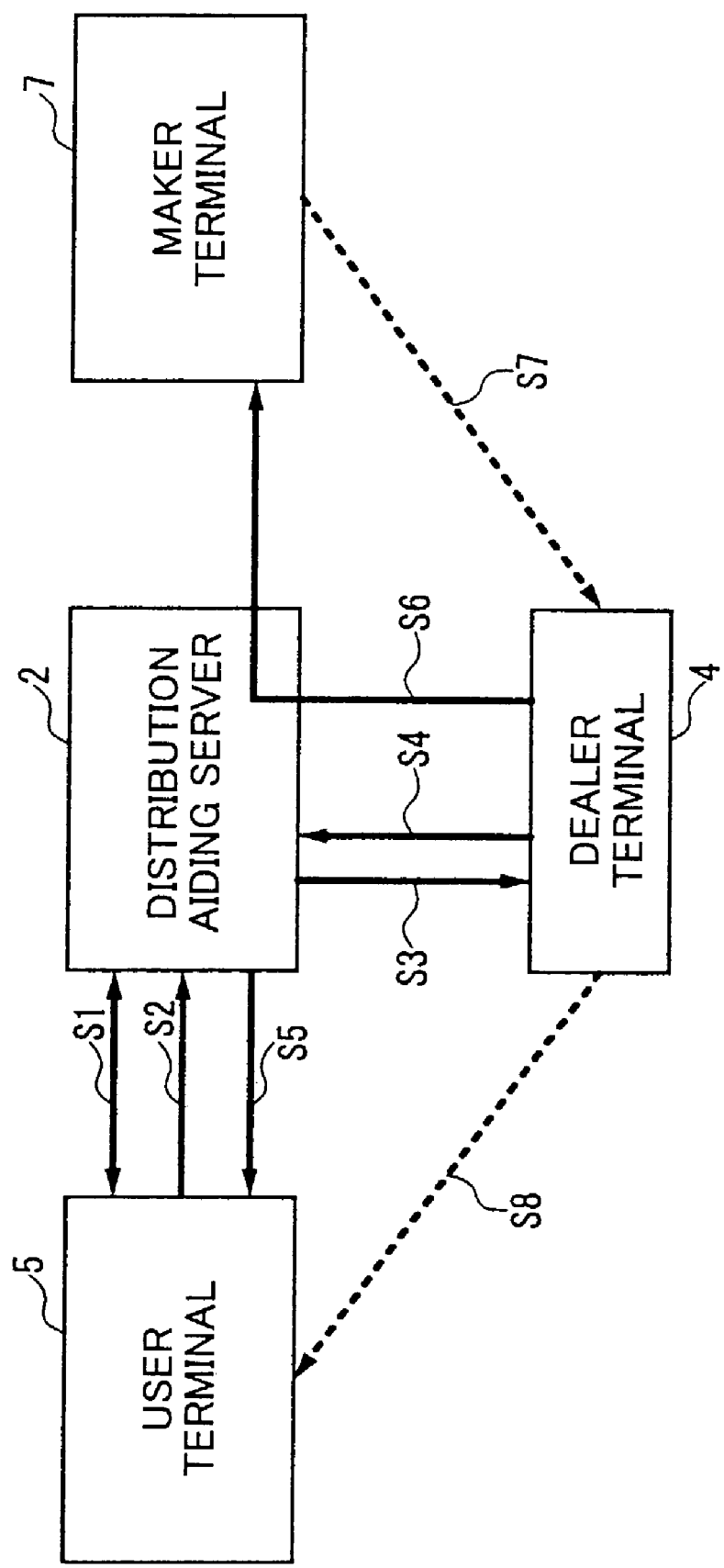
FIG. 3 is a diagram of an example for explaining an order-accepting/placing process of the distribution aiding system according to the present invention.

Next, a description will be given, with reference to FIG. 3, of a procedure of an order-accepting/placing process using the distribution aiding system according to the present invention, for the purpose of facilitating an understanding of the distribution aiding system according to the present invention. FIG. 3 shows a diagram of an example for explaining the order-accepting/placing process of the distribution aiding system according to the present invention.

A user using the distribution aiding system according to the present invention connects the user terminal 5 to the distribution aiding server 2 via the network 6, such as the Internet. In step S1 in FIG. 3, the user selects a desired reagent from a commodity master included in the distribution aiding server 2. The selection of the desired reagent can be performed by using a commodity search function owned by the distribution aiding server 2. Additionally, the selection of the reagent can be also performed directly by the user without using the commodity search function. Further, the selection of the reagent can be also performed by the user after narrowing down reagents by using the commodity search function. Then, in step S2, the user orders the desired reagent or requests an estimation of the desired reagent. Order information or estimation request information from the user is stored in the distribution aiding server 2.

A dealer using the distribution aiding system according to the present invention connects the dealer terminal 4 to the distribution aiding server 2 via the network 6. In step S3 in FIG. 3, the dealer downloads the order information or the estimation request information from the user to the dealer terminal 4, and adds order-acceptance condition information, such as an estimation and a delivery date; and in step S4, the dealer uploads the order information or the estimation request information from the user to which information the order-acceptance condition information is added. Besides, the dealer also can confirm the order information or the estimation request information from the user stored in the distribution aiding server 2, and add the order-acceptance condition information, such as an estimation and a delivery date, to the order information or the estimation request information, as occasion demands.

In step S5, the distribution aiding server 2 can inform the user terminal 5 of the order-acceptance condition information, such as an estimation and a delivery date, for the order information or the estimation request information from the user, by using electronic mail, etc., for example. Besides, the distribution aiding server 2 can also create order-reception information corresponding to the order information registered by the user, and notify the user of the order-reception information, as occasion demands. This order-reception information may include information regarding the reagent included in the order information registered by the user.

Additionally, the distribution aiding system according to the present invention may further include article ordering means for referring to stock information of the dealer in charge of the user, and placing an order with a maker for articles in stock shortage, for example when the stock runs short, according to stock status of the article included in the order information.

In the distribution aiding system as above, the stock information of the dealer can be referred to so that, when the stock of the article included in the order information runs short, the articles can be automatically ordered to the maker. Additionally, the distribution aiding system according to the present invention may further include means for ascertaining a maker stock.

In step S6, when the reagent included in the order information from the user is in stock shortage, the dealer submits an order for the reagent to a maker terminal 7. When the dealer places the order for the reagent with the maker in step S6, the maker delivers the reagent to the dealer in step S7. In step S8, the dealer delivers to the user the reagent included in the order information from the user.

Besides, the distribution aiding server 2 can also issue a bill to the user according to the order-acceptance condition information, such as an estimation and a delivery date, added to the order information by the dealer. Accordingly, the order-accepting/placing process for a reagent becomes possible without registering the order-acceptance condition information, such as a price and a delivery date, determined by the dealer for each user, beforehand in the distribution aiding server 2.

Figure 4:
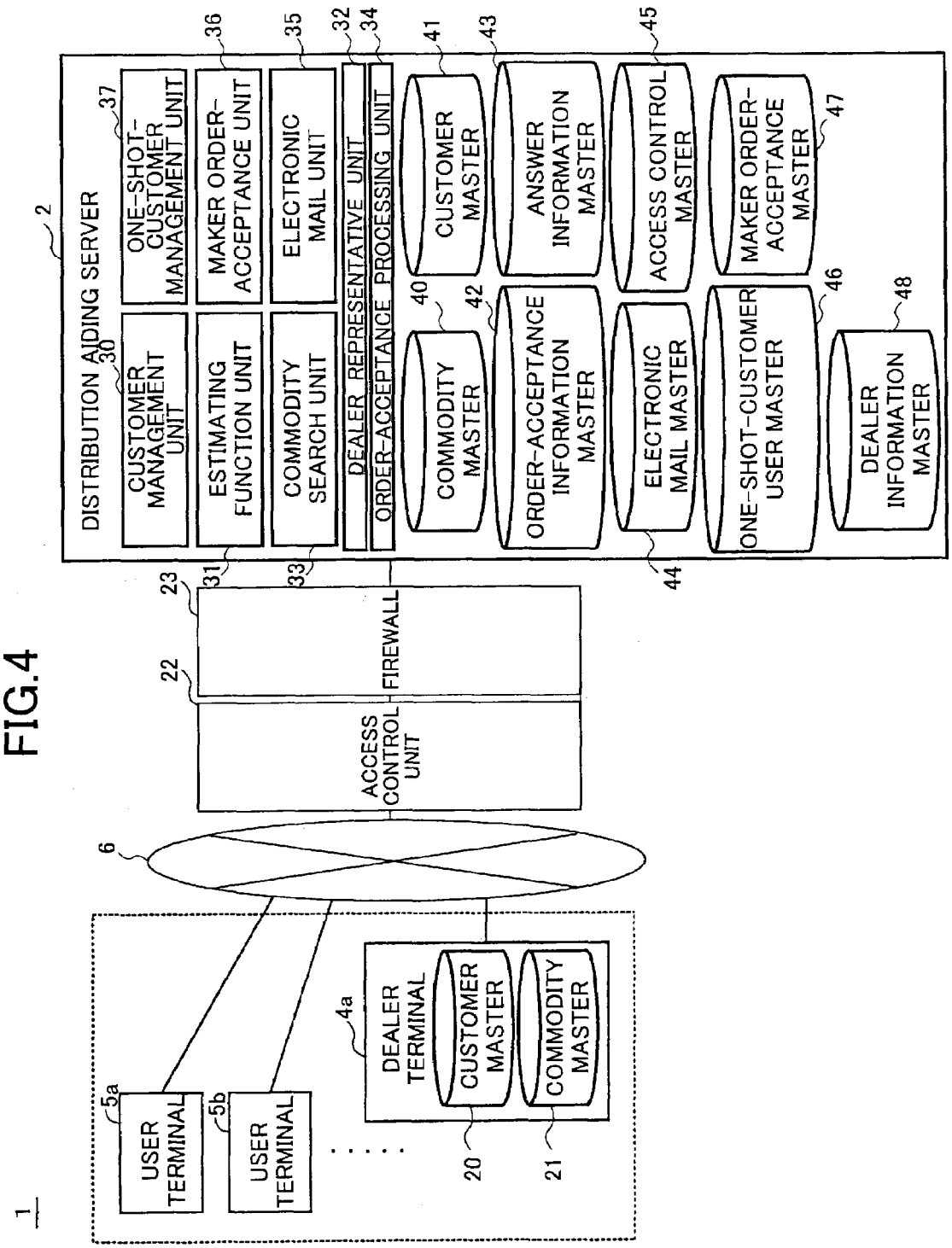
FIG. 4 is a diagram of an example for explaining functions of the distribution aiding system according to the present invention.

To enable the above-described order-accepting/placing process, the distribution aiding system 1 according to the present invention has various functions. Next, a description will be given, with reference to FIG. 4, of functions of the distribution aiding system 1 according to the present invention. FIG. 4 shows a diagram of an example for explaining the functions of the distribution aiding system 1 according to the present invention. It is noted that the distribution aiding system 1 shown in FIG. 4 includes only parts necessary for explaining the functions depicted, and unnecessary parts are partially omitted from the figure.

The distribution aiding system 1 includes the user terminals 5a to 5n, the dealer terminal 4a, and the distribution aiding server 2 connected to the user terminals 5a to 5n and the dealer terminal 4a via the network 6, an access control unit 22 and a firewall 23. The users operating the user terminals 5a to 5n are users for whom the dealer operating the dealer terminal 4a is in charge of an order acceptance and a delivery of a reagent. The dealer terminal 4a includes a customer master 20 for managing information of the users for whom the dealer operating the dealer terminal 4a is in charge of the order acceptance and the delivery of a reagent, and a commodity master 21 in which a price of a reagent and so forth are determined for each user.

The access control unit 22 authenticates the users and the dealers connecting to the distribution aiding server 2 according to the authentication information, such as a user TD and a password. The firewall 23 protects the distribution aiding server 2 and so forth from an illegal entry. The distribution aiding server 2 comprises a customer management unit 30, an estimating function unit 31, a dealer representative unit 32, a commodity search unit 33, an order-acceptance processing unit 34, an electronic mail unit 35, a maker order-acceptance unit 36, a one-shot-customer management unit 37, a commodity master 40, a customer master 41, an order-acceptance information master 42, an answer information master 43, an electronic mail master 44, an access control master 45, a one-shot-customer user master 46, a maker order-acceptance master 47, and a dealer information master 48.

The customer management unit 30 stores and manages access logs of users or dealers using the distribution aiding server 2, in the access control master 45. The estimating function unit 31 provides an estimating function for the one-shot-customer users to whom the authentication information is not issued whereby the general users are qualified only to estimate reagents. The estimating function unit 31 stores and manages information of the one-shot-customer users provided with the estimating function, in the one-shot-customer user master 46.

The dealer representative unit 32 ascertains a stock of reagents included in order information from a user, and places an order with a maker for reagents in stock shortage. Besides, the dealer representative unit 32 stores and manages dealer information, such as a name, an address and a telephone number of a dealer, in the dealer information master 48. Additionally, the dealer representative unit 32 stores and manages users for whom each dealer is in charge of an order acceptance and a delivery, in the customer master 41.

FIG. 5 shows a configuration diagram of an example of the customer master 41. It is noted that the customer master 41 shown in FIG. 5 includes only extracted parts necessary for the following explanation, and does not include all of items. The customer master 41 includes a user ID, a password, a user level, a company name, a full name, a telephone number, a facsimile number, an E-mail address, a personal code, a dealer code, a destination BOX-ID, a reference BOX-ID, an organization form flag, a material code, a field, and so forth.

Here, the user level is an item used for distinguishing among a user, a dealer and a system administrator. The personal code is a code assigned to a user by each dealer. The dealer code is an item used for distinguishing a dealer in charge of the user. Thus, the customer master 41 stores a dealer and a user for whom the dealer is in charge of an order acceptance and a delivery with the dealer and the user being related.

The commodity search unit 33 provides the commodity search function for users and one-shot-customer users. The commodity search unit 33 retrieves information, such as a general price, a delivery date and properties, of a reagent desired by a user, from commodity information stored in the commodity master 40, and provides the information to the user. Besides, for users (not for one-shot-customer users), the information retrieved and provided for the user by the commodity search unit 33 may include an actual selling price of the reagent desired by the user, the actual selling price being determined for the present user by the dealer in charge of the present user. When disclosing this actual selling price, it is arranged that the actual selling price be disclosed only to the present user, and not disclosed to other users or other makers.

The order-acceptance processing unit 34 stores and manages the order information from a user in the order-acceptance information master 42. Additionally, the order-acceptance processing unit 34 stores and manages the order-acceptance condition information, such as an estimated price and a delivery date, with respect to the order information from a user in the answer information master 43.

When the order-acceptance condition information is stored in the answer information master 43, the electronic mail unit 35 can transmit the order-acceptance condition information to the user placing the order corresponding to the order-acceptance condition information, according to electronic mail information stored in the electronic mail master 44. Besides, by storing information, such as a specialty field, of each user in the electronic mail master 44, the electronic mail unit 35 can transmit not only the order-acceptance condition information to the user, but also can transmit information beneficial for the user by electronic mail.

The maker order-acceptance unit 36 stores and manages information of a reagent for which a maker accepts an order, in the maker order-acceptance master 47. The one-shot-customer management unit 30 stores and manages access logs of one-shot-customer users using the distribution aiding server 2, in the access control master 45.

Users and dealers can perform the order-accepting/placing process for a reagent by using the various functions of the distribution aiding system 1 as described above. For example, it is conceivable that a user or a dealer uses the distribution aiding system according to the present invention in a manner that the user or the dealer logs in from the user terminals 5a to 5n or the dealer terminal 4a via the network 6, the access control unit 22 and the firewall 23 to the distribution aiding server 2.

Figure 6:
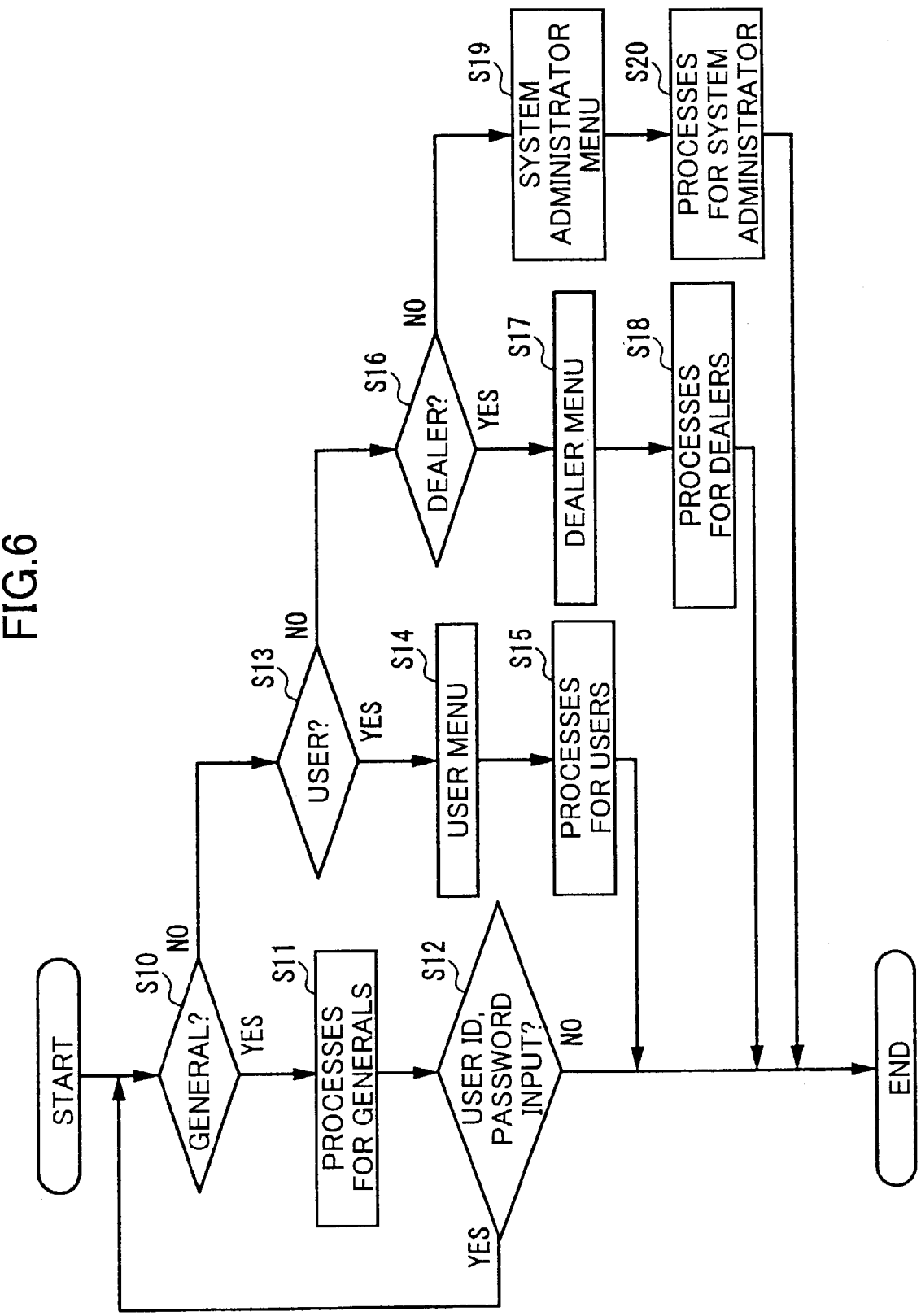
FIG. 6 is a flowchart of one embodiment of the distribution aiding system according to the present invention.
Figure 7:
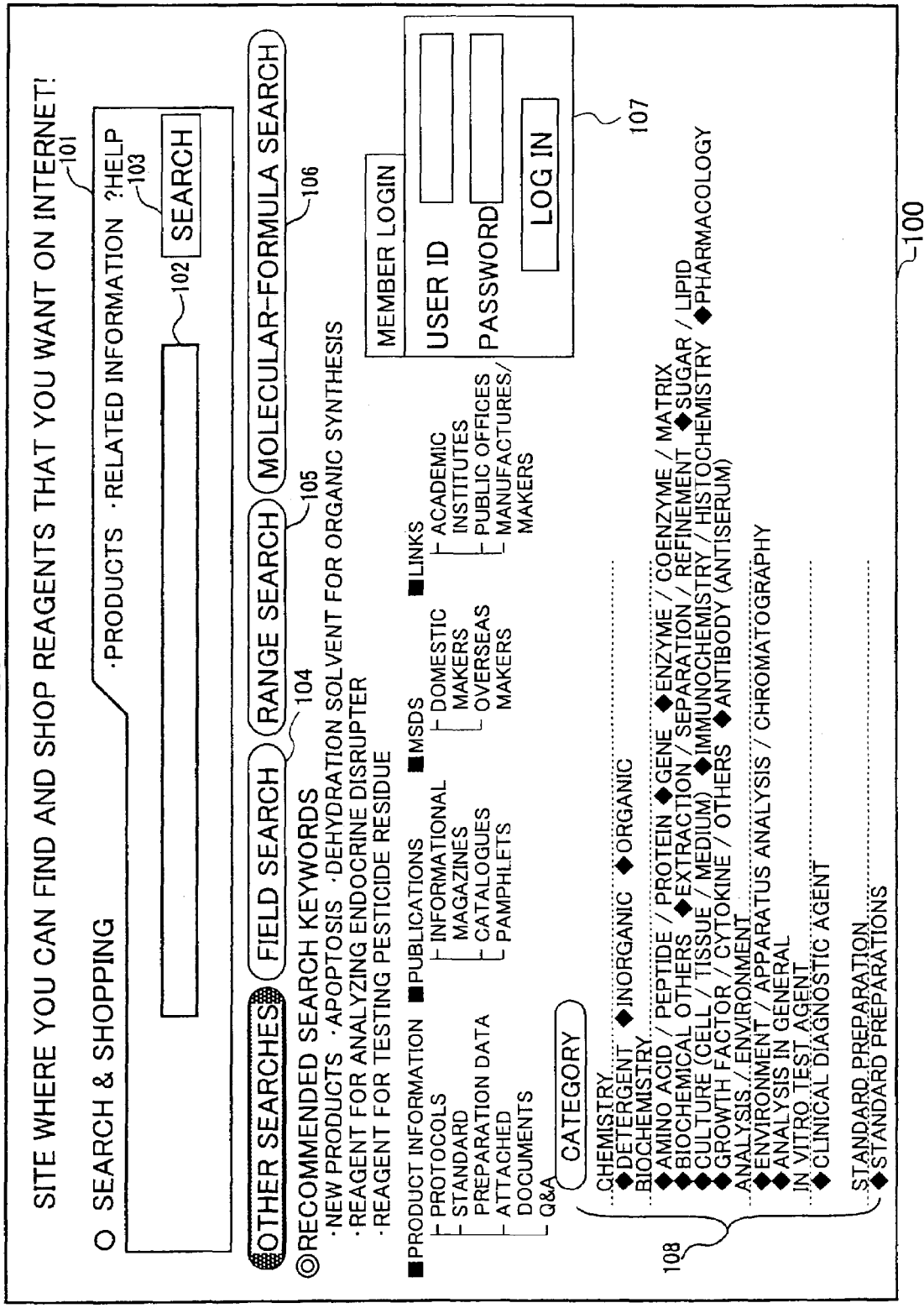
FIG. 7 is a screen diagram of an example of a top menu screen.

Next, a description will be given, with reference to FIG. 6, of a process of the distribution aiding system according to the present invention. FIG. 6 shows a flowchart of one embodiment of the distribution aiding system according to the present invention. First, when a one-shot-customer user, a user or a dealer connects to the distribution aiding server 2 by using the user terminals 5a to 5n or the dealer terminal 4a, a top menu screen 100 as shown in FIG. 7 is displayed on a display device of the user terminals 5a to 5n or the dealer terminal 4a.

The top menu screen 100 includes a keyword search area 101 for providing the commodity search function, and a member login area 107 for inputting a user ID and a password. In step S10 in FIG. 6, the distribution aiding server 2 judges whether or not the user who has read out the top menu screen 100 is a general user (a one-shot-customer user) not granted a user ID and a password.

When the user ID and the password issued by the distribution aiding server 2 are not input in the member login area 107 (YES in S10), the user is judged to be a general user, proceeding to step S11. In step S11, the distribution aiding server 2 provides the user judged to be a general user with processes for generals, such as various search functions of the top menu screen 100. Proceeding from step S11 to step S12, the distribution aiding server 2 judges whether or not the user ID and the password are input in the member login area 107.

When the user ID and the password are not input in the member login area 107 (NO in S12), the process is ended. Besides, it is also conceivable that, when the user ID and the password are not input in the member login area 107 in S12, the process proceeds to step S11. When the user ID and the password are input in the member login area 107 (YES in S12), the distribution aiding server 2 proceeds to step S10.

When the user ID and the password issued by the distribution aiding server 2 are input in the member login area 107 (NO in S10), the distribution aiding server 2 judges that the user who has read out the top menu screen 100 is not a general user, and proceeds to step S13.

Figure 8:
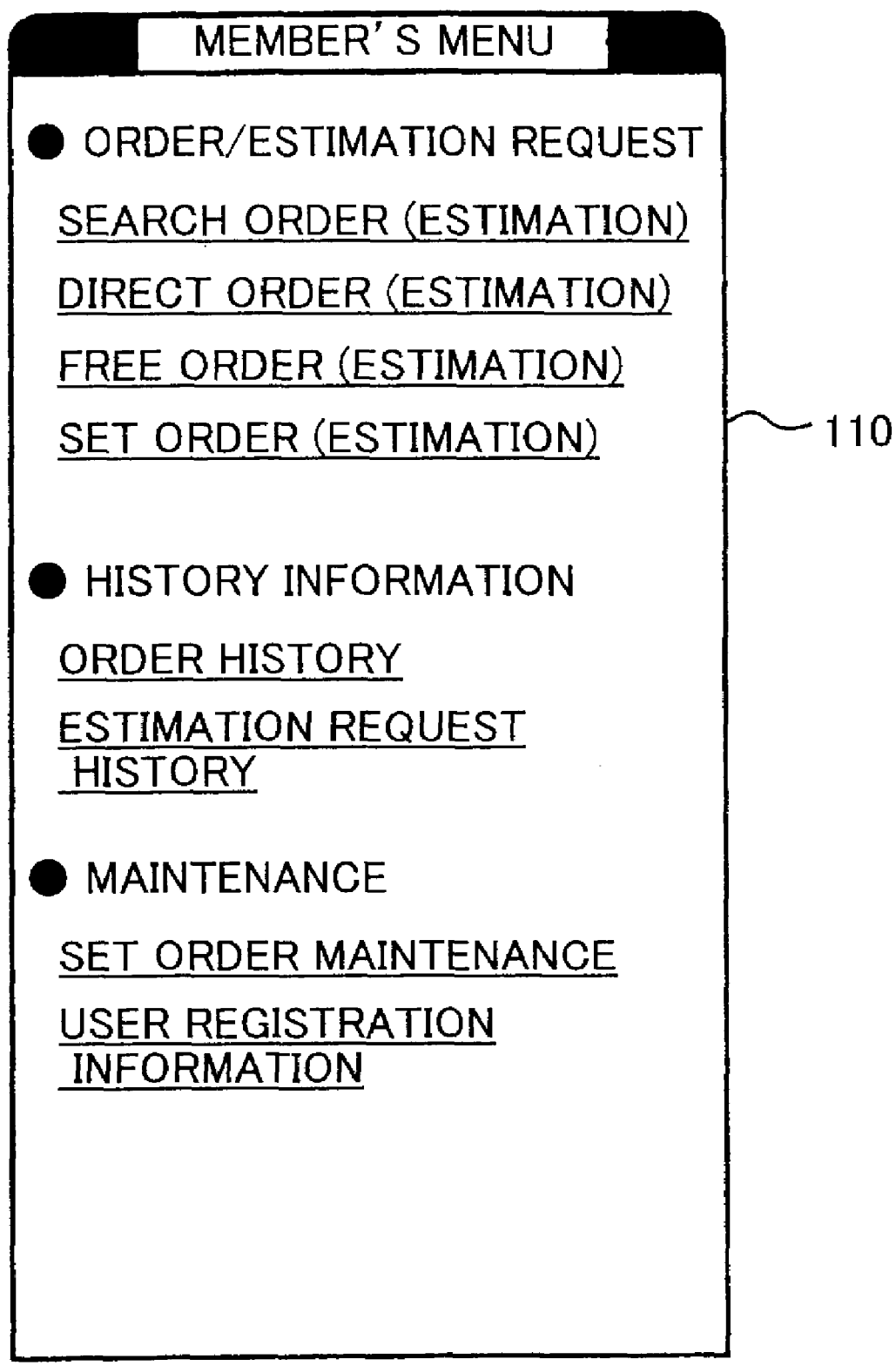
FIG. 8 is a screen diagram of an example of a user menu screen.

In step S13, the distribution aiding server 2 confirms the user ID and the password input in the member login area 107, and judges whether or not the user who has read out the top menu screen 100 is a user. When judging that the user who has read out the top menu screen 100 is a user (YES in S13), the distribution aiding server 2 proceeds to step S14, and causes a user menu screen 110 as shown in FIG. 8 to be displayed on the display device of the user terminal 5a, for example. The user menu screen 110 includes an "•order/estimation request" area, a "•history information" area and a "•maintenance" area. Besides, processes for users performed in the user menu screen 110 are described hereinafter.

Proceeding from step S14 to step S15, the distribution aiding server 2 provides the user judged to be a user with the processes for users, such as an order/estimation request function of the user menu screen 110. The user can use a desired process by selecting the desired process from the user menu screen 110.

On the other hand, when judging that the user who has read out the top menu screen 100 is not a user (NO in S13), the distribution aiding server 2 proceeds to step S16. In step S16, the distribution aiding server 2 confirms the user ID and the password input in the member login area 107, and judges whether or not the user who has read out the top menu screen 100 is a dealer.

Figure 9:
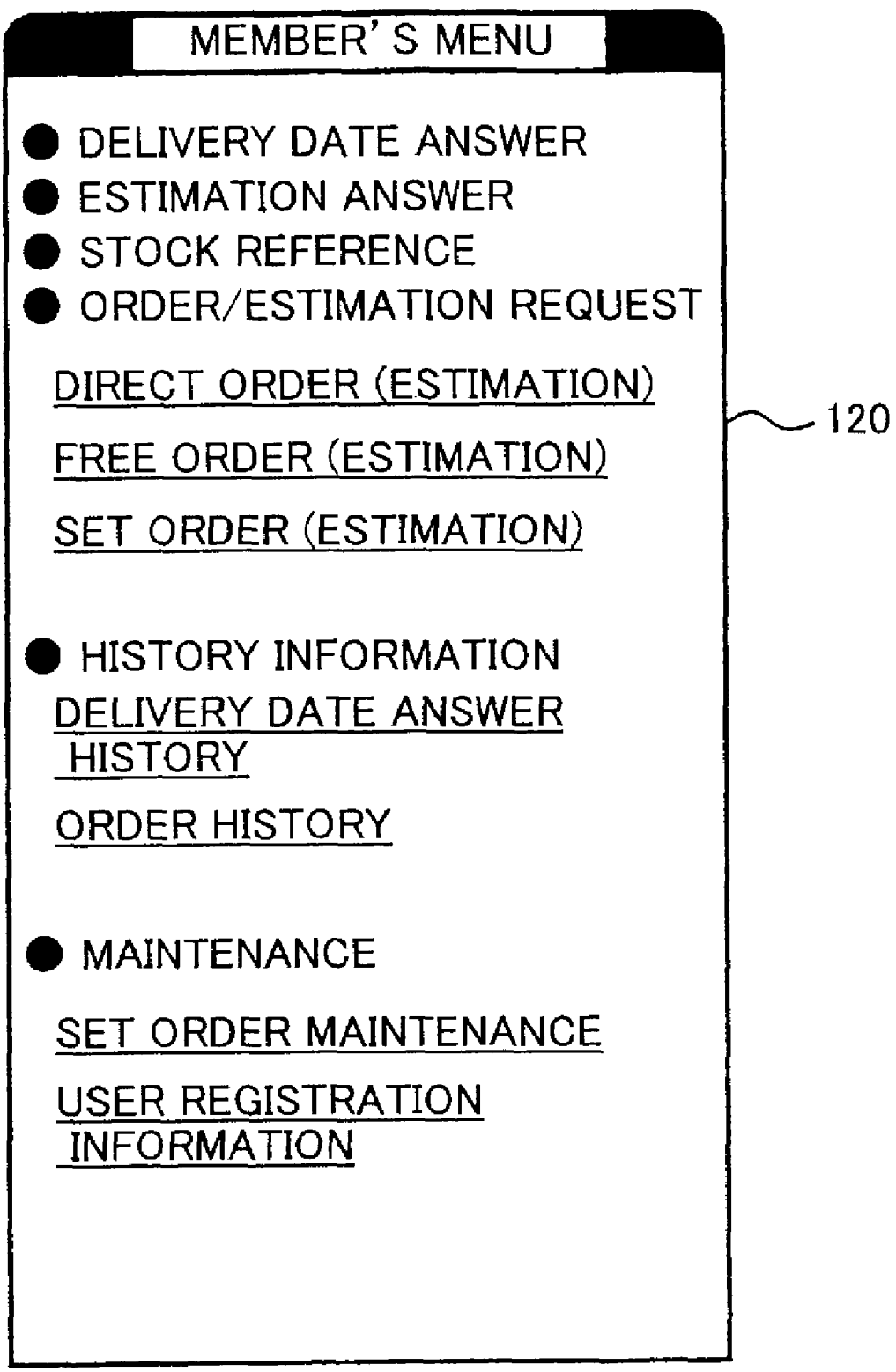
FIG. 9 is a screen diagram of an example of a dealer menu screen.

When judging that the user who has read out the top menu screen 100 is a dealer (YES in S16), the distribution aiding server 2 proceeds to step S17, and causes a dealer menu screen 120 as shown in FIG. 9 to be displayed on the display device of the dealer terminal 4a, for example.

The dealer menu screen 120 includes a "•delivery date answer" area, an "•estimation answer" area, a "•stock reference" area, an "•order/estimation request" area, a "•history information" area, and a "•maintenance" area. Besides, processes for dealers performed in the dealer menu screen 120 are described hereinafter.

On the other hand, when judging that the user who has read out the top menu screen 100 is not a dealer (NO in S16), the distribution aiding server 2 proceeds to step S19. In step S19, the distribution aiding server 2 judges that the user who has read out the top menu screen 100 is a system administrator, and causes a system administrator menu screen to be displayed on a display device of a system administrator terminal. Then, proceeding from step S19 to step S20, the system administrator can perform various maintenances by using the system administrator menu.

Next, a further detailed description will be given of the processes for generals (S11), the processes for users (S15) and the processes for dealers (S18) shown in FIG. 6. The processes for generals provide the various search functions and information service functions of the top menu screen 100 for a general user (a one-shot-customer user) not yet granted a user ID and a password.

For example, a general user can use a full-text search function by inputting a keyword regarding a desired reagent in a keyword area 102 of the keyword search area 101, and clicking a search button 103. Additionally, search functions other than the full-text search function can be used by clicking a field search button 104, a range search button 105 and a molecular-formula search button 106. Besides, a category search function can be used by utilizing a category search area 108 of the top menu screen 100. A plurality of search functions can be used in combination.

Additionally, the distribution aiding server 2 can provide a general user with the estimating function. Besides, when it is not determined which dealer is in charge of the general user, it is conceivable that an answer of the estimation can be made according to a recommended retail price of a reagent stored in the commodity master 40.

Figure 10:
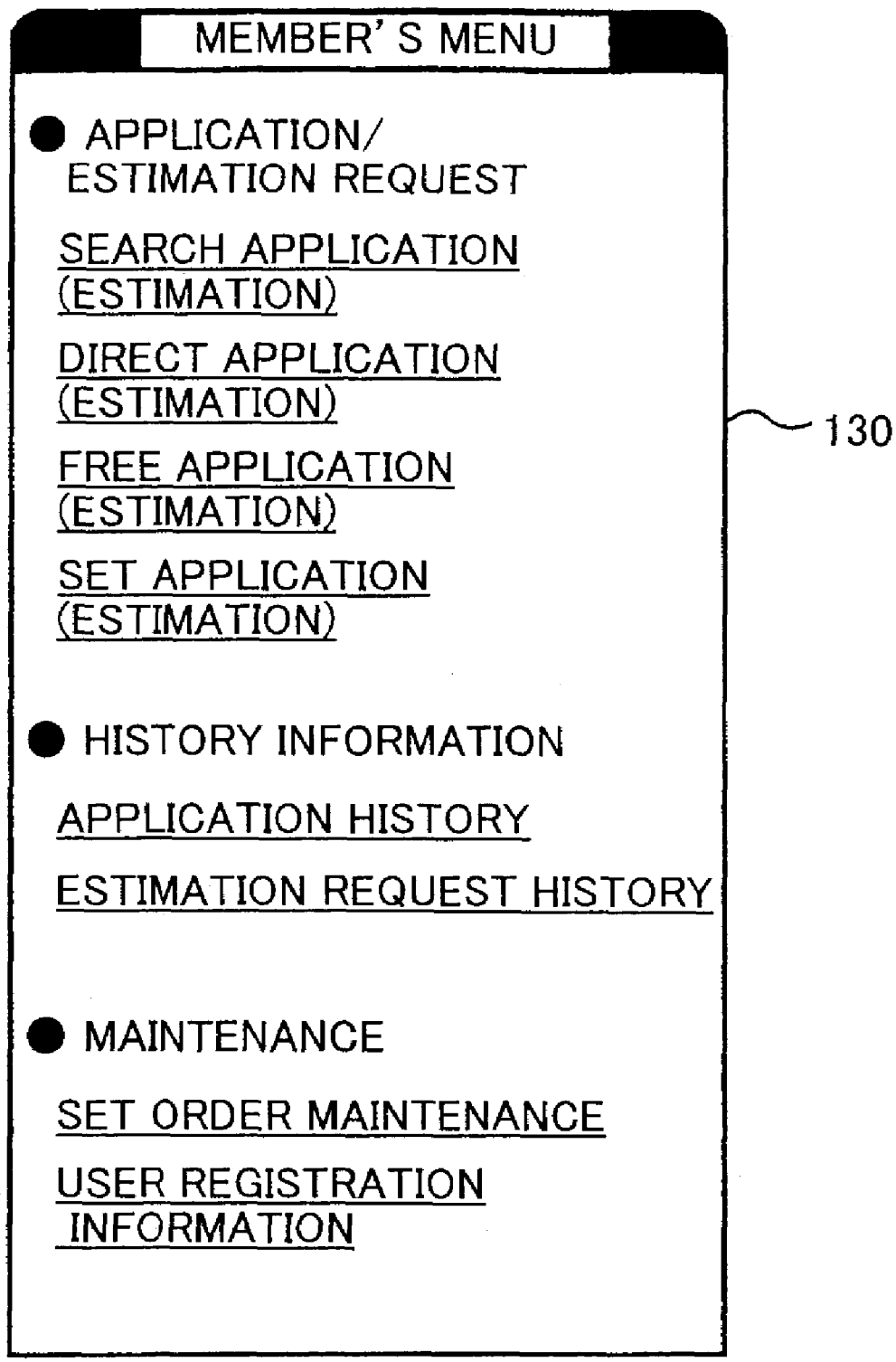
FIG. 10 is a screen diagram of an example of an application user menu screen.
Figure 11:
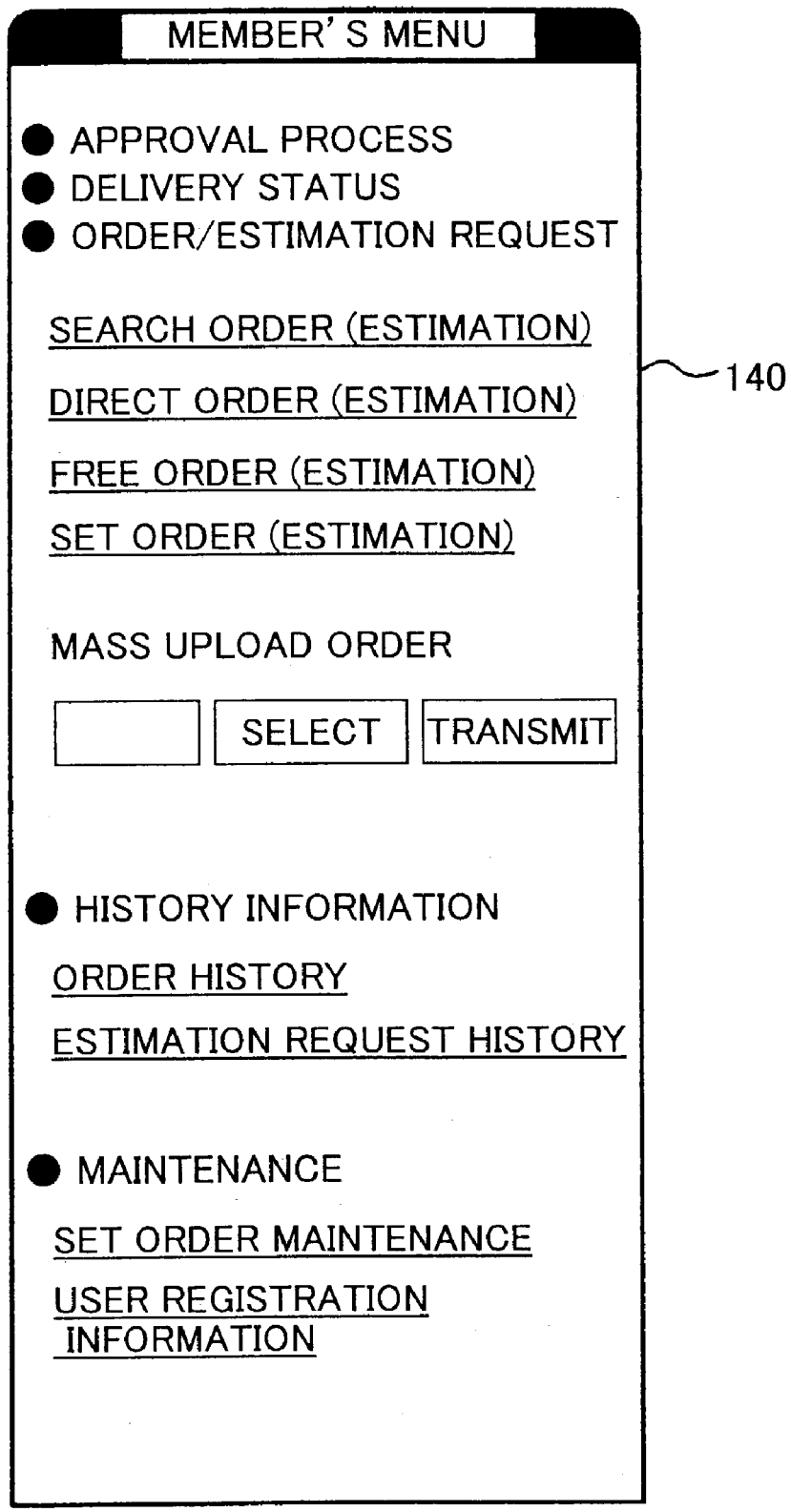
FIG. 11 is a screen diagram of an example of an approval user menu screen.

The processes for users provide an order/estimation request function, a history information function and a maintenance function of the user menu screen 110 for a user granted a user ID and a password. Besides, in a case of an organization form with subdivided role powers for ordering, application, approval and so forth, it is conceivable that an order application of a reagent and an order approval thereof are performed separately. Thereupon, the distribution aiding server 2 according to the present invention provides an application user menu screen 130 as shown in FIG. 10 for performing the order application of a reagent, and an approval user menu screen 140 as shown in FIG. 11 for performing the order approval of a reagent.

The above-mentioned user, the application user and the approval user can be distinguished by using a user ID, a password, a user level, an organization code and so forth of the customer master. Besides, upon issuing a user ID, etc., it is confirmed beforehand that a person is qualified to purchase a legally controlled object (such as a poisonous material, when the commodity is a reagent, for example).

For example, a user can select and use a search order function, a direct order function, a free order function or a set order function from the "•order/estimation request" area in the user menu screen 110. The search order function is an ordering method performed by selecting a desired reagent from a list of search results obtained by using the full-text search function, etc. The direct order function is an ordering method performed by directly designating a maker name, a commodity code, a volume, a quantity and so forth of a reagent desired by the user.

The free order function is an ordering method performed by designating a maker name, a commodity name, a grade, a volume, a quantity and so forth of a reagent not appearing in a catalogue, etc. The free order function is realized by inputting the maker name, the commodity name, the grade, the volume, the quantity and so forth in a free order screen 190 as shown in FIG. 16. For example, the commodity name is inputted in a commodity name area 191 of the free order screen 190.

The set order function is an ordering method in which a user groups several types of reagents frequently purchased together into a set, and designates the reagents grouped into the set. The set order function is realized by selecting one set from sets No. 1 to No. 5 in a set order screen 200 as shown in FIG. 17, the sets No. 1 to No. 5 being registered beforehand by the user. For example, the set order screen 200 shown in FIG. 17 displays a "chromato-package" set registered in the set No. 1. The user can select all of reagents registered in the "chromato-package" set, or can select some of those reagents.

In addition, a user can select and use an order history function or an estimation request history function of the "•history information" area in the user menu screen 110. The order history function is a function for referring to an order history in the past. The estimation request history function is a function for referring to an estimation request history in the past. Besides, an order request can be performed by selecting a desired reagent from the order history in the past and the estimation request history in the past referred to by using the order history function and the estimation request history function.

In addition, a user can select and use a set order maintenance function or a user registration information function of the "•maintenance" area in the user menu screen 110. The set order maintenance function is a function for providing a setting for reagents grouped into a set used by the above-mentioned set order function. The user registration information function is a function for editing user information registered in the distribution aiding server.

On the other hand, the application user menu screen 130 is similar to the user menu screen except the "•order/estimation request" area. Since an application user cannot formally place an order without an approval of an approval user (a manager), the "•order/estimation request" area includes a search application function, a direct application function, a free application function and a set application function.

Besides, since the application user menu screen 130 is similar to the user menu screen 110 except that the application user does not formally place an order without an approval of the approval user, other descriptions are omitted.

Additionally, the approval user menu screen 140 includes an "•approval process" area, a "•delivery status" area, an "•order/estimation request" area, a "•history information" area and a "•maintenance" area. An approval user can refer to a list of order applications performed by an application user by selecting an approval process function of the "•approval process" area in the approval user menu screen 140. The approval user examines order applications listed in the list of order applications, and decides on approval or disapproval. Besides, an approved order application is changed to a formal order. Additionally, the approval user can approve a disapproved order application after changing a content of the disapproved order application.

An approval user can refer to a status of a delivery by selecting a delivery status function of the "•delivery status" area in the approval user menu screen 140. Besides, the "•order/estimation request" area, the "•history information" area and the "•maintenance" area in the approval user menu screen 140 are basically similar to the user menu screen 110, but are different in a point that a "mass upload order" function is added in the "•order/estimation request" area; therefore, a description will be given to only this point.

That is, the "mass upload order" function is a function useful for users, such as a material department of a company, frequently ordering a large variety of commodities at regular intervals, and is a function enabling an order by using an order-commodity list file created beforehand. This function may seem similar to the "set order" function; however, the "set order" function is provided for the convenience of small-lot users normally ordering few types of commodities; thus, the two functions are different in this point.

The processes for dealers provide a dealer with a delivery date answer function, an estimation answer function, a stock reference function, an order/estimation request function, a history information function, and a maintenance function, of the dealer menu screen 120. For example, a dealer can select and use the delivery date answer function of the "•delivery date answer" area in the dealer menu screen 120. When the dealer selects the delivery date answer function, a delivery-date answer status screen 150 as shown in FIG. 12 is displayed on the display device of the dealer terminal 4a, for example.

When the dealer selects one item of order-acceptance information, in which a delivery date is answered, from the delivery-date answer status screen 150, a delivery-date answer particulars screen 160 as shown in FIG. 13 is displayed on the display device of the dealer terminal 4a. Then, the dealer can create delivery-date answer information for an order acceptance by inputting a quantity, a price and a delivery date of a commodity in item areas of "quantity", "delivery price" and "delivery date" in the delivery-date answer particulars screen 160. Besides, the delivery-date answer information can be transmitted automatically by the electronic mail unit 35 of the distribution aiding server 2, for example.

A dealer can select and use the estimation answer function of the "•estimation answer" area in the dealer menu screen 120. When the dealer selects the estimation answer function, an estimation answer list screen 170 as shown in FIG. 14 is displayed on the display device of the dealer terminal 4a, for example. When the dealer selects one estimation request information from the estimation answer list screen 170, an estimation answer particulars screen 180 as shown in FIG. 15 is displayed on the display device of the dealer terminal 4a.

Then, the dealer can create estimation answer information for the estimation request by inputting a quantity, a price and a delivery date of a commodity in item areas of "quantity", "delivery price" and "delivery date" in the estimation answer particulars screen 180. Besides, the estimation answer information can be transmitted automatically by the electronic mail unit 35 of the distribution aiding server 2, for example.

Further, a dealer can select and use the stock reference function of the "•stock reference" area in the dealer menu screen 120. The dealer uses the stock reference function, whereby the dealer can perform a stock reference to a maker.

As described above, in the distribution aiding system according to the present invention, an order-accepting/placing process for a commodity becomes possible without registering individual trading conditions, such as a price and a delivery date of the commodity, determined individually between a user and a dealer, beforehand in the distribution aiding server. Accordingly, the order-accepting/placing process for the commodity becomes possible without the individual trading conditions being known to a maker, other users or other dealers.

The distribution aiding system according to the present invention may be arranged to cooperate with other Web-EDI (Electronic Data Interchange) systems. In this case, it may be arranged that the other Web-EDI systems can be used from the distribution aiding system according to the present invention, or conversely, it may be arranged that the distribution aiding system according to the present invention can be used from the other Web-EDI systems.

The present invention is not limited to the above-described embodiment, and variations and modifications may be made without departing from the scope of the present invention.

The invention claimed is:

1. A distribution aiding method embodied on recording mediums for execution by processors for a distribution aiding server, a dealer computer terminal and a user computer terminal, for conducting a sale of an article between a user using the user computer terminal and a dealer in charge of said user using the dealer computer terminal, said article being an article from a maker for the article, where said user computer terminal and said dealer computer terminal are connected to said distribution aiding server via a computer network, the method comprising:

an article search step in which the user connects said user computer terminal with said distribution aiding server via said computer network and searches or selects a necessary article;

an order information registration step in which said user registers order information, with use of said user computer terminal connected with said distribution aiding server said order information being available to the dealer in charge of said user, according to said selected article;

an order-acceptance condition registration adding step in which the dealer in charge of said user connects said dealer computer terminal to said server via said computer network to download the order information and adds order-acceptance condition information including a delivery price which the user pays the dealer to be added to said order information on said dealer computer terminal including an article master file storing the delivery price of the article determined for each said user, without registering in the distribution aiding server and without being known to a maker, other users or other dealers; and an order-acceptance condition notification step in which the dealer in charge of said user uploads to said server the order information including the order-acceptance condition information to be sent to said user so that said user alone is notified of said order-acceptance condition information, wherein said article from the maker is available to the user solely through a sale of the article by said dealer in charge of said user.

2. The distribution aiding method as claimed in claim 1, wherein said order information registration step is a step of registering said order information after an approval of a manager is obtained in a case where said user is a user who cannot register said order information without obtaining said approval of said manager.

3. The distribution aiding method as claimed in claim 1, further comprising an order-reception information notification step of creating order-reception information according to the order information registered by said user, and notifying said user of said order-reception information.

4. The distribution aiding method as claimed in claim 1, further comprising an article order step of referring to stock information of the dealer in charge of said user, and placing an order with the maker for the article included in said order information according to stock status of the article.

5. The distribution aiding method as claimed in claim 1, further comprising: an authentication step of performing an authentication of the user or the dealer in charge of said user connecting the user computer terminal or the dealer computer terminal via said computer network; and a menu screen display step of displaying a menu screen on said user computer terminal or said dealer computer terminal in accordance with a result of said authentication.

6. The distribution aiding method as claimed in claim 1, further comprising a free order information registration step in which said user connects said user computer terminal and registers order information with respect to an article which is unregistered.

7. The distribution aiding method as claimed in claim 1, further comprising: a set registration step in which several types of articles to be ordered at one time and order quantities of said articles are registered as a set; and a set order information registration step in which said user connects said user computer terminal and registers order information according to said set.

8. A distribution aiding server for conducting a sale of an article between a user using a user computer terminal and a dealer in charge of said user using a dealer computer terminal, said article being an article front a maker for the article, where said user computer terminal and said dealer computer terminal are connected to said distribution aiding server via a computer network, the user computer terminal, the dealer computer terminal and the server having method computer software residing on a recording medium, comprising: an article search part for the user to connect said user computer terminal and search or select a necessary article; an order information registration part for said user to register order information, available to the dealer in charge of said user, according to said selected article; an order-acceptance condition registration part for the dealer in charge of said user to connect said dealer computer terminal and register order-acceptance condition information, including a delivery price which the user pays the dealer, to be added to said order information on said dealer computer terminal, including an article master file storing a delivery price of the article determined for each user, without registering in the distribution aiding server and without being known to a maker, other users or other dealers; and an order-acceptance condition notification part for notifying said user of said order-acceptance condition information, wherein said article from the maker is available to the user solely through a sale of the article by said dealer in charge of said user.

9. A distribution aiding method embodied on recording mediums for execution by processors for a distribution aiding server, a dealer computer terminal and a user computer terminal, for conducting a sale of an article by using the user computer terminal of a user, the dealer computer terminal of a dealer in charge of said user, and the distribution aiding server connected to said user computer terminal and said dealer computer terminal via a computer network, the method, comprising:

a step in which the user connects said user computer terminal to said distribution aiding server and searches or selects a necessary article;

a step in which said user connects said user computer terminal to said distribution aiding server and registers order information, available to the dealer in charge of said user, according to said selected article;

a step in which the dealer in charge of said user connects said dealer computer terminal to said distribution aiding server to download the order information and adds order-acceptance condition information, including a delivery price which the user pays the dealer, available to the user, to said order information on said dealer computer terminal, including an article master file storing the delivery price of the article determined for each said user, without registering in the distribution aiding server and without being known to a maker, other users or other dealers; and a step in which said user is notified of said order-acceptance condition information by the dealer in charge of said user uploading the order information including the order-acceptance condition information, via the server, to solely the user, wherein said article from the maker is available to the user solely through a sale of the article by said dealer in charge of said user.

10. A computer readable recording medium, residing on a server, a user computer terminal and a dealer computer terminal, storing a program for conducting a sale of an article between a user using the user computer terminal and a dealer in charge of said user using the dealer computer terminal, where said user computer terminal and said dealer computer terminal are connected via a computer network, the recording medium storing a program including:

an article search part for the user to connect said user computer terminal and to search or select a necessary article;

an order information registration part for said user to register order information, available to the dealer in charge of said user, according to said selected article;

an order-acceptance condition registration adding part for the dealer in charge of said user to connect said dealer computer terminal to download the order information and add order-acceptance condition information, including a delivery price which the user pays the dealer, to be added to said order information on said dealer computer terminal, including an article master file storing the delivery price of the article determined for each said user, without registering in the distribution aiding server and without being known to a maker, other users or other dealers; and an order-acceptance condition notification part for notifying said user of said order-acceptance condition information by the dealer in charge of said user uploading the order information including the order-acceptance condition information to solely the user, wherein said article from the maker is available to the user solely through a sale of the article by said dealer in charge of said user.

11. A distribution aiding program residing on recording mediums of a user computer terminal, a dealer computer terminal and a distribution aiding server for causing to perform:

an article search procedure in which a user connects the user computer terminal to the distribution aiding server via a computer network and searches or selects a necessary article;

an order information registration procedure in which said user registers order information, available to a dealer in charge of said user, according to said selected article;

an order-acceptance condition registration procedure in which the dealer in charge of said user connects the dealer computer terminal to said distribution aiding server via said computer network to download the order information and adds order-acceptance condition information, including a delivery price which the user pays the dealer, to be added to said order information on said dealer computer terminal, including an article master file storing the delivery price of the article determined for each user, without registering in the distribution aiding server without being known to a maker, other users or other dealers; and an order-acceptance condition notification procedure in which said user alone is notified by the dealer in charge of said user of said order-acceptance condition information by uploading the order information including the order-acceptance condition information, wherein said article from the maker is available to the user solely through a sale of the article by said dealer in charge of said user.

* * * * *